April 11, 1967 — E. G. SWETT — 3,313,514
MUSIC STAND
Filed Oct. 8, 1965 — 5 Sheets-Sheet 1
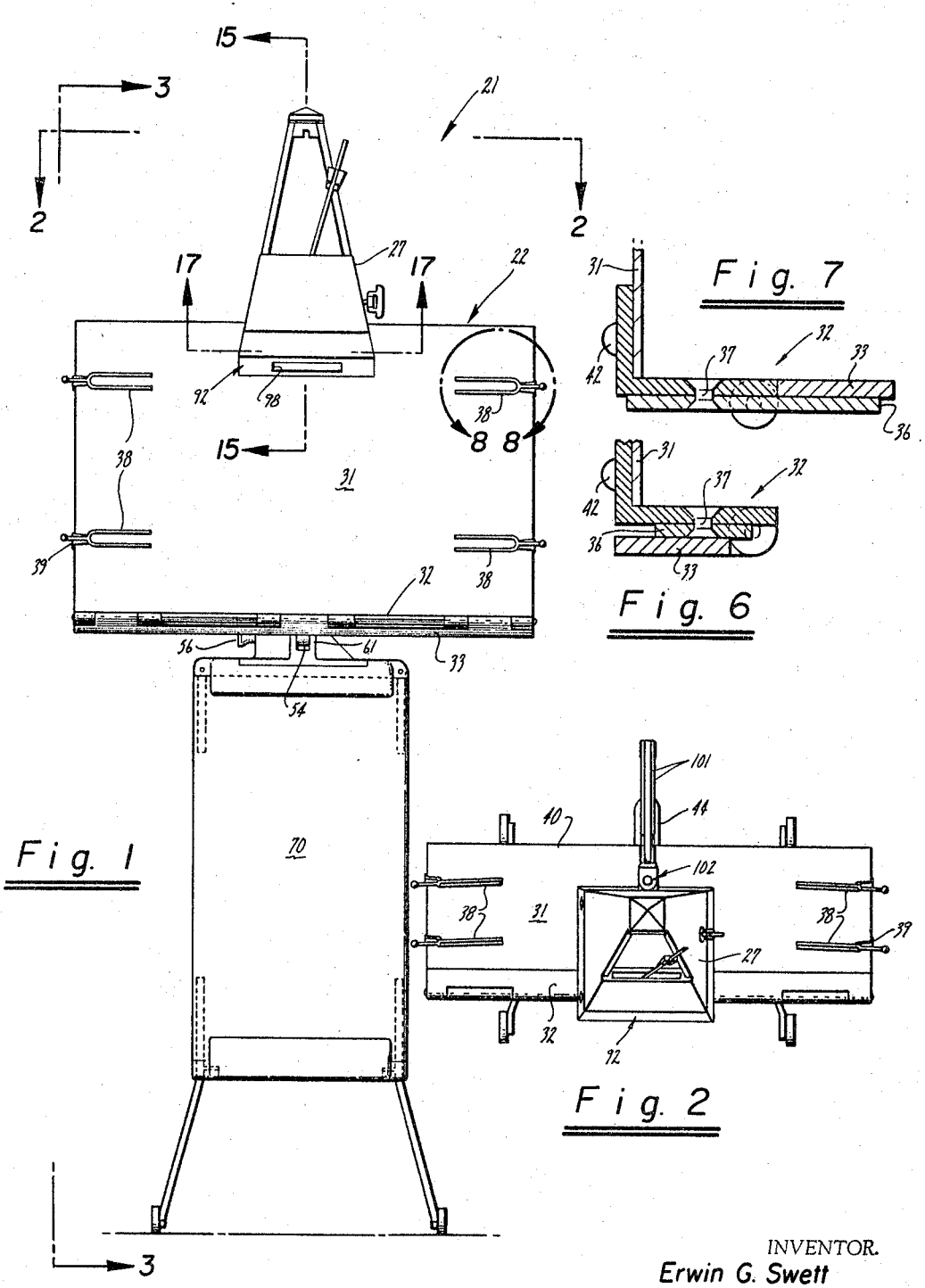
INVENTOR.
Erwin G. Swett
BY
Attorneys April 11, 1967 — E. G. SWETT — 3,313,514
MUSIC STAND
Filed Oct. 8, 1965 — 5 Sheets-Sheet 2
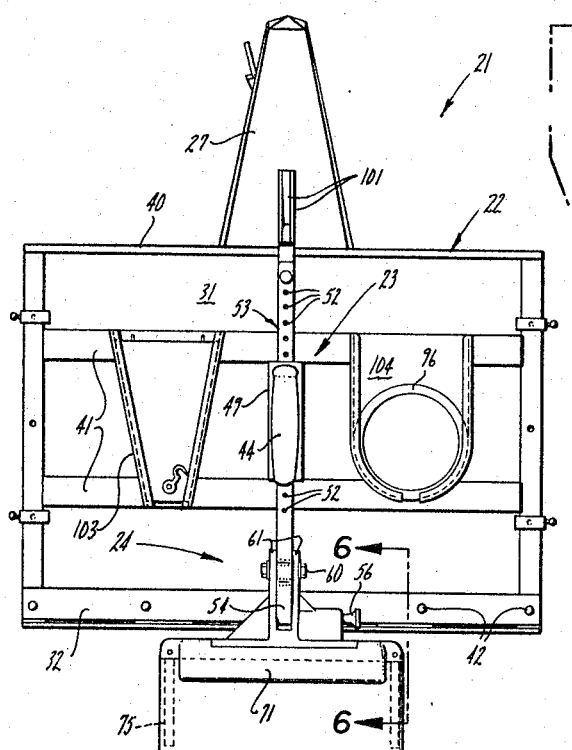
Fig. 4
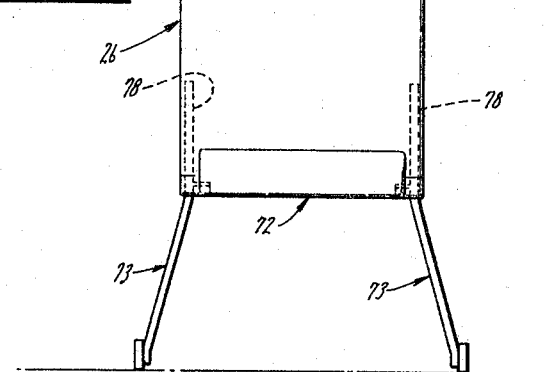
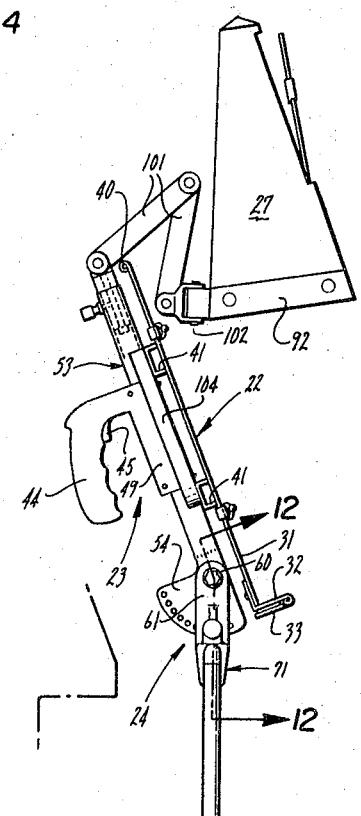
Fig. 3
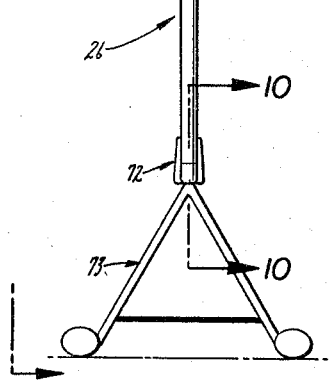
INVENTOR.
Erwin G. Swett
BY
Attorneys

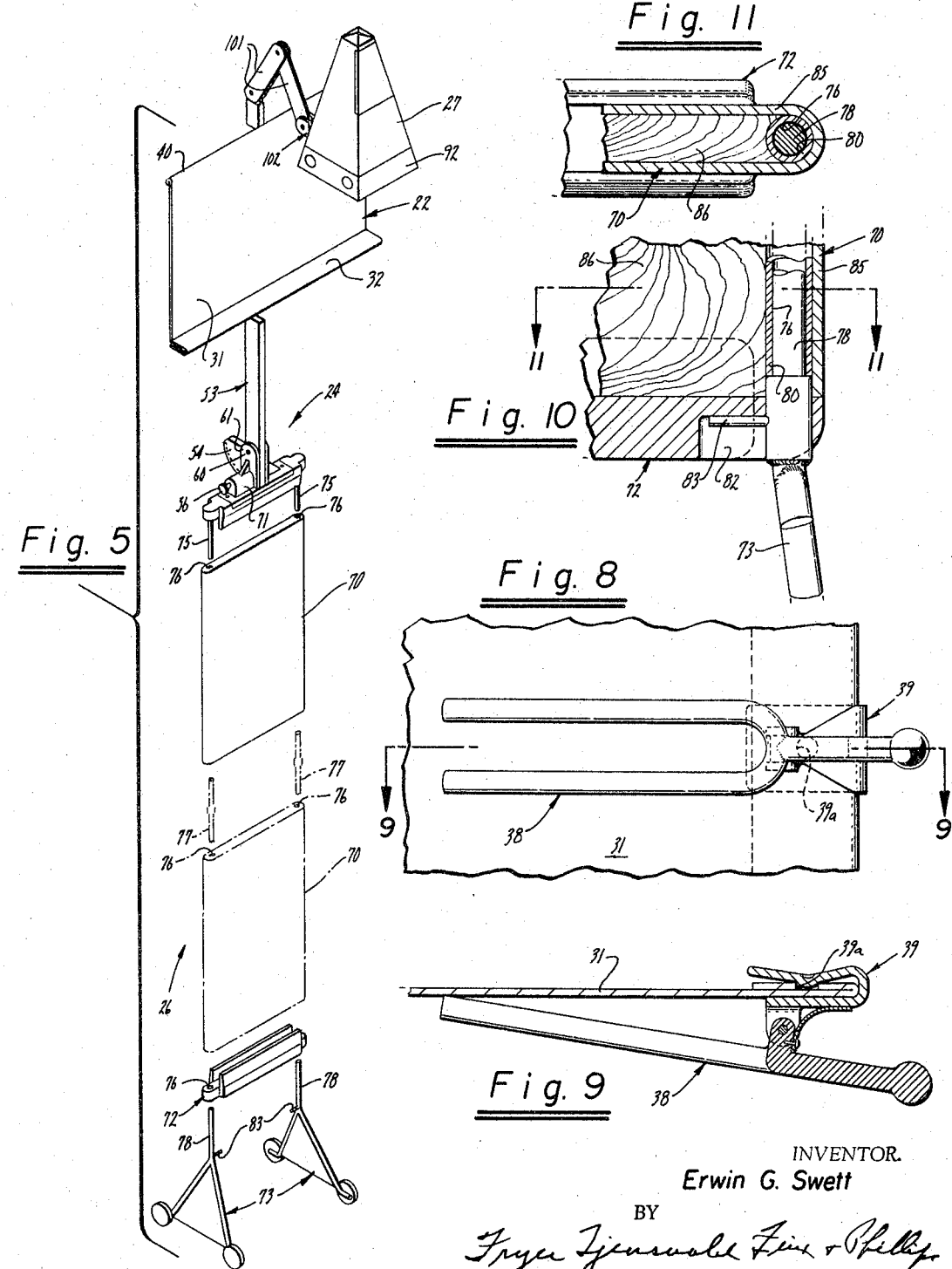

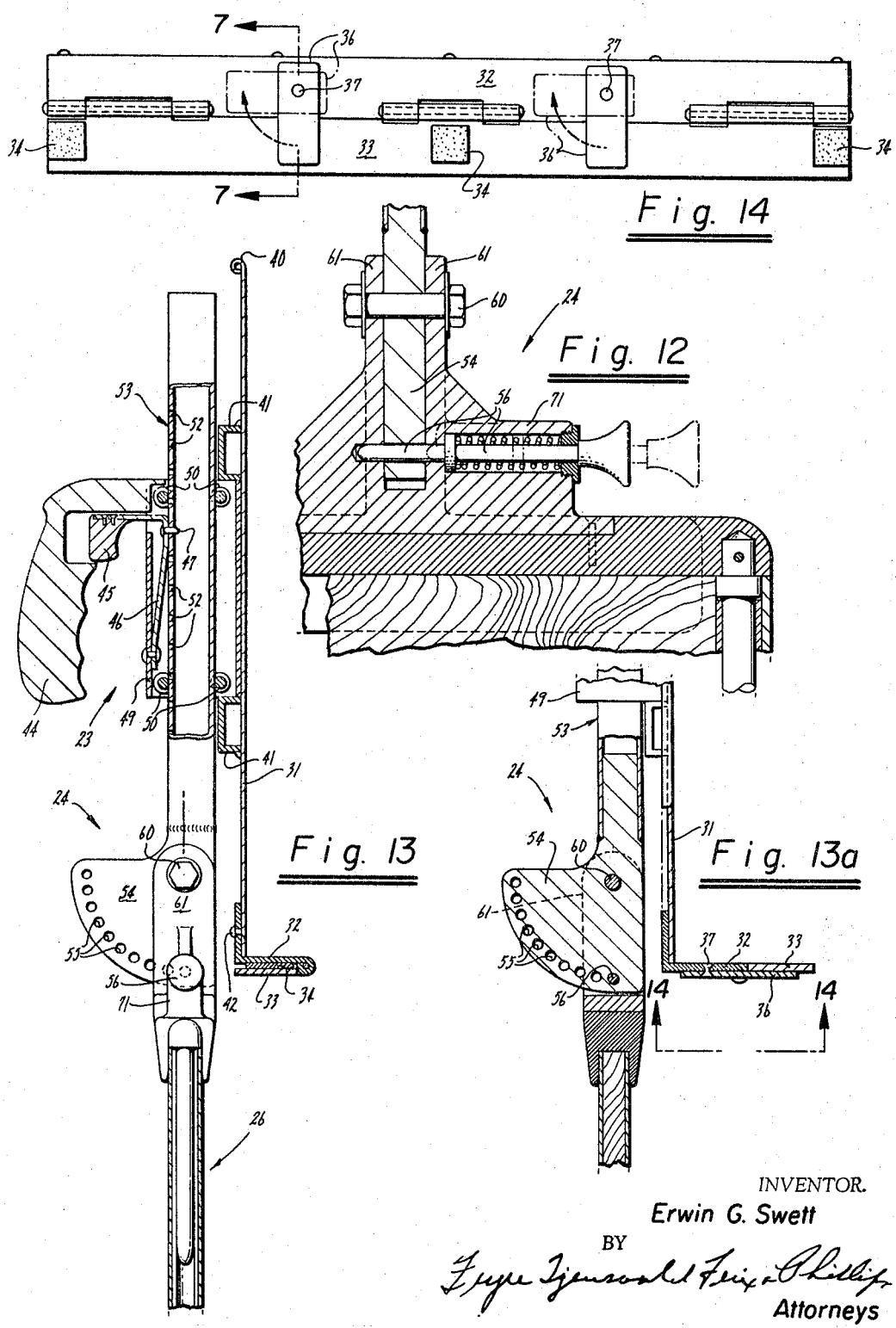

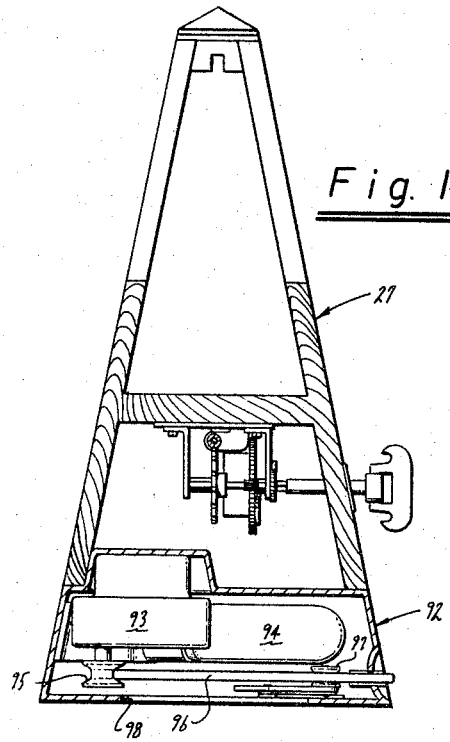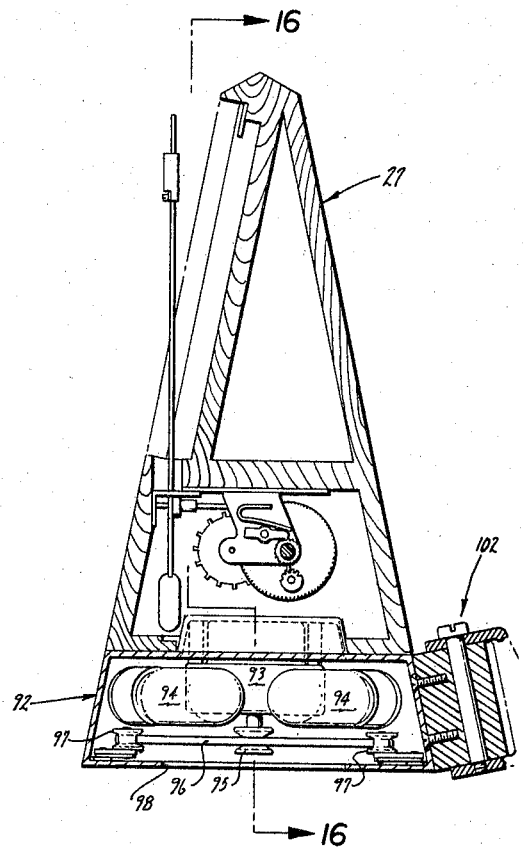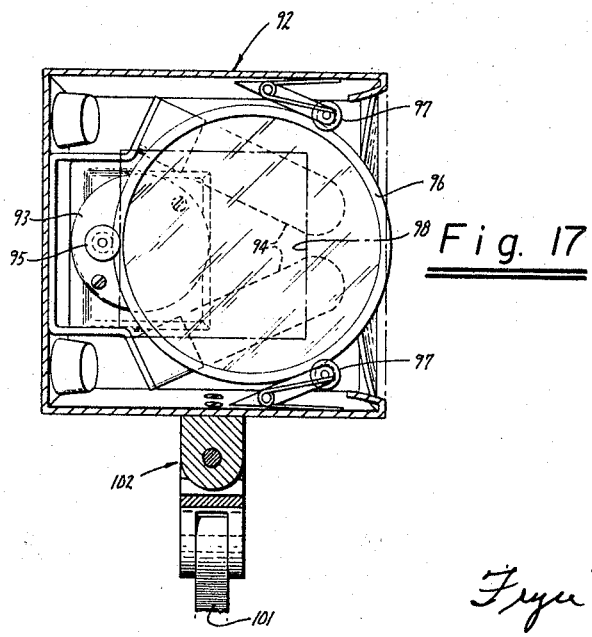

United States Patent Office 3,313,514
Patented Apr. 11, 1967

3,313,514
MUSIC STAND
Erwin G. Swett, 462 22nd Ave., Apt. 6,
San Francisco, Calif. 94121
Filed Oct. 8, 1965, Ser. No. 494,110
7 Claims. (Cl. 248—457)

This invention relates generally to music stands and more particularly to a collapsible and portable music stand having several adjustable features.

The music stand incorporates features which allow the musician to adjust the height of the scriptholder with respect to the floor, to adjust the angle of reclination of the scriptholder, and to adjust the direction of the light from the lamp by means of which the sheet music supported on the scriptholder may be illuminated.

Also, the music stand incorporates optional features such as a metronome especially useful to the music teacher and pupil, and an ever-changing multi-color light display for producing decorative light patterns especially suited for auditoriums and dance pavillions.

The music stand of the present invention incorporates a panel arrangement which performs three functions. It serves as a height adjustment. It permits the stand to be disassembled and stored compactly. It also gives the entire stand a quite attractive appearance when assembled and can be decorated to suggest the field of music. A music stand incorporating this panel arrangement is a primary object of this invention.

It is a related object of this invention to construct a music stand which is both portable and collapsible, and has features which may be conveniently adjusted to meet the needs of a particular musician in a particular stage setting.

It is a further object of this invention to construct a scriptholder which is detachable from the music stand, and is universally mountable for use as a copyholder or as a speaker's stand.

It is a further object of this invention to construct a music stand useful for music teaching purposes for pupils of all ages.

Referring to the drawings:

FIG. 1 is a front elevational view of one embodiment of the music stand of the present invention.

FIG. 2 is a top plan view taken along the line and in the direction indicated by the arrows 2—2 in FIG. 1.

FIG. 3 is a side elevational view taken along the line and in the direction indicated by the arrows 3—3 in FIG. 1.

FIG. 4 is a back elevational view of the music stand shown in FIG. 1.

FIG. 5 is an exploded perspective view of the music stand.

FIG. 6 is a section taken along the line and in the direction indicated by the arrows 6—6 of FIG. 4, showing the lip of the scriptholder in its folded position.

FIG. 7 is a section taken along the line and in the direction indicated by arrows 7—7 of FIG. 14 showing the lip of the scriptolder in its extended position.

FIG. 8 is a fragmentary view of the scriptholder with a sheet music clip.

FIG. 9 is a section taken along the line and in the direction indicated by arrows 9—9 of FIG. 8.

FIG. 10 is a fragmentary view partially in section taken along the lines and in the direction indicated by the arrows 10—10 of FIG. 3.

FIG. 11 is a section taken along the line and in the direction indicated by arrows 11—11 of FIG. 10.

FIG. 12 is a section taken along the lines and in the direction indicated by the arrows 12—12 of FIG. 3.

FIG. 13 is a fragmentary view partly in section taken along the lines and in the direction indicated by the arrows 13—13 of FIG. 4.

FIG. 13A is an elevation view, partly in section, of a portion of FIG. 13.

FIG. 14 is a bottom plan view of the lip of the scriptholder in its unfolded or extended position.

FIG. 15 is a section through the metronome and light fixture taken along the line and in the direction indicated by the arrows 15—15 of FIG. 1.

FLG. 16 is a section taken along the line and in the direction indicated by the arrows 16—16 of FIG. 15; and FIG. 17 is a section taken along the line and in the direction indicated by the arrows 17—17 of FIG. 1.

Referring now to the drawings and particularly to FIGS. 1, 2, 3 and 4, reference numeral 21 depicts one embodiment of the improved music stand constructed in accordance with the present invention.

As shown in FIG. 3, a scriptholder 22 is attached to first vertical adjustment means shown generally at 23.

The vertical adjustment means 23 co-operate with angular adjustment means shown generally at 24 so that the scriptholder may be adjusted vertically and reclined at preselected angular positions.

The angular adjustment means 24 are in turn mounted on suppport means indicated generally at 26.

As best seen in FIG. 5, the support means 26 include second vertical adjustment means on individual stackable panels pieces 70 by means of which the scriptholder may also be vertically adjusted.

A metronome box 27 is adjustably mounted to the upper end of the angular adjustment means 24, and may include a light source by means of which sheet music supported on the scriptholder may be illuminated.

The scriptholder 22 comprises a back 31 and an adjustable lip 32. The lip may be extended by means of lip extension 33 hinged as shown in FIGS. 1, 6, 7 and 14 along the outer edge of lip 32. When the lip is not extended, magnets 34 serve to hold the lip extension to the bottom of the lip; however, when it is desired to extend the lip, rest 36, pivoted at 37 is moved from its position shown in dotted lines in FIG. 14 to its position shown in heavy lines.

Detachable spring loaded clips 38 as shown in FIGS. 8 and 9 are constructed with slip-on-clips 39 to co-operate with notches 39a in the side margins of the back of the scriptholder to facilitate their attachment to the scriptholder. The clips serve to clamp loose sheet music to the face of the scriptholder.

The top edge of the back 31 is rimmed at 40 and its rear mid portion is reinforced by channels 41. As seen in FIGS. 4 and 14, the lip 32 may be riveted to the back 31 by rivets 42.

As seen in FIG. 13, handle 44 carries a trigger 45 which is spring-loaded by leaf 46. The leaf bears an insertion pin 47 which cooperates with holes 52 in angular adjustment means 24 to be described in detail later. Enclosed within handle channel 49, which is attached to the rear of back 31 of the scriptholder between channels 41, are rollers 50. Accordingly, the scriptholder 22 may be selectively positioned along and locked to track 53 of the angular adjustment means 24. This provides one form of vertical adjustment whereby the height of the scriptholder may be varied with respect to the floor.

Referring next to FIGS. 12, 13 and 13A, the angular adjustment means 24 comprises track 53 which terminates at its bottom portion in quadrant 54 which has holes 55 located along its arc portion. A spring-loaded pin 56 is located in the shoulder 71 of support means 26. Pin 56 cooperates with holes 55. Consequently, the track may be pivoted about bolt 60 inserted through fork elements 61 of shoulder 71 and locked at any one of the various preselected angles of reclination. Accordingly, the scriptholder which rides along the track 53 can be adjusted by the musician to assume any one of a plurality of preselected angles of reclination.

Referring next to FIGS. 5, 10 and 11, the support means 26 includes second vertical adjustment means or individual stackable panel pieces 70, and comprises shoulder 71, carrier 72, and legs 73. As best seen in FIG. 5, the shoulder carries two dowel pins 75 which mate in upper dowel holes 76 in the panel piece. Each panel piece also has lower holes 76 to receive either dowel pins 77 shown in dotted lines in FIG. 5 or the vertical rods 78 of legs 73. The height that the scriptholder generally assumes above the floor is dependent upon the number of panel pieces that are stacked between the shoulder and the carrier. Further vertical adjustment of the scriptholder, however, may be made by means of vertical adjustment means 24 as described above.

As seen in FIG. 10, rod 78 enters re-enforcing sleeve 80 in dowel hole 76 in the bottom of the panel piece. To prevent legs 73 from rotating, the bottom of the carrier 72 is recessed in its middle portion as by recess 82 so that it may receive pin 83 horizontally projecting from rod 78.

The panel pieces may be constructed from sheet metal 85 which may be wrapped around filler material such as wood pieces 86. While FIG. 5 does not show rotatable wheels, the legs 73 may carry coasters 88 which are rotatable so that the music stand may be rolled along the floor.

Referring next to FIGS. 5, 15, 16 and 17, the metronome box 27 may include a typical metronome mechanism well-known in the art. Since the type of mechanism itself does not form part of this invention, it will not be described.

Attached to the bottom of the metronome box as by screws 91 (FIG. 15) is a light chamber 92 which includes an electric motor 93 and light bulbs 94. The electrical connections to the electric motor and for the light bulbs are not shown. The electric motor drives pulley 95 which frictionally engages the periphery of a transparent circular light filter 96. The circular filter is further caused to frictionally engage the drive pulley 95 by spring-biased positioning wheels 97. The circular filter may include segments of various colors, and consequently, as it is induced to rotate by drive pulley 95, the light which emerges from opening 98 in the bottom of light chamber 92 will change from color to color in accordance with the color scheme of the filter. If ordinary light only is desired the colored transparent circular filter may be replaced by one having no color and then the electric motor need not, of course, be energized.

Metronome box 27 is adjustably secured to the top of track 53 as best seen in FIG. 3 by extensible arms 101 and by swivel joint 102 so that the light emerging from opening 98 in the bottom of light chamber 92 may be directed to illuminate the sheet music supported by the back 31 and the lip 32 of the scriptholder.

The improved music stand 21 incorporates designs synonymous with the field of music such as clips 38 in the shape of a pitch or tuning fork and a lamp shade in the form of a metronome box 27. The improved music stand is collapsible but may easily be re-assembled. For compactness the back 31 carries holder 103 as shown in FIG. 4 in which the metronome box face plate may be placed. Similarly holder 104 carries spare light filters 96.

I claim:
1. A portable and collapsible floor stand for holding sheet music and the like and comprising a scriptholder for supporting material to be viewed, angular adjustment means for selectively sustaining said script holder in one of a plurality of angles of reclination, first vertical adjustment means for selectively sustaining said scriptholder in one of a plurality of heights with respect to the floor, and support means including second vertical adjustment means comprising vertically stackable panel pieces interlockable with dowel pins for supporting said scriptholder, angular adjustment means and first vertical adjustment means.

2. A floor stand as defined in claim 1 and comprising a source of illumination adjustably secured to the top of the angular adjustment means and overlying the scriptholder, and wherein said scriptholder comprises a back and a lip which includes a lip extension hingedly associated with the lip.

3. A floor stand as defined in claim 2 wherein said support means comprises, in association with said vertically stackable panel pieces, a shoulder detachably dowelled to the top of a panel piece, a carrier, and legs having vertically extending dowel-like projections which extend through dowel holes in both said carrier and the bottom of a panel piece.

4. A floor stand as defined in claim 3 wherein said first vertical adjustment means includes a channel mounting rollers therein and connected to the back of said scriptholder, and wherein said angular adjustment means includes a track on which the rollers roll for vertical adjustment of the scriptholder.

5. A floor stand as defined in claim 4 wherein said first vertical adjustment means includes a handle and trigger, said trigger having a pin insertable in mating apertures in said track to lock the scriptholder at selected positions along the track.

6. A floor stand as defined in claim 1 further comprising spring-loaded clips for securing loose material to the scriptholder, said spring-loaded clips having concealed slip-on-clips detachably connecting the spring-loaded clips to the side edges of the scriptholder.

7. A floor stand as defined in claim 2 further comprising a metronome associated with said source of illumination, said metronome having a color-changing device which includes interchangeable light filters of one or more colors for coloring the rays of the illumination, said device also including driving means for rotating said light filter.

References Cited by the Examiner
UNITED STATES PATENTS

| | | | |
|---|---|---|---|
| 393,934 | 12/1888 | Talbott | 312—230 |
| 820,336 | 6/1906 | Bancroft | 248—161 X |
| 1,507,384 | 9/1924 | Knowlton | 248—454 |
| 2,522,270 | 9/1950 | Hoffmann | 248—441 |
| 2,732,481 | 1/1956 | King | 248—454 X |

CHANCELLOR E. HARRIS, *Primary Examiner.*